(12) United States Patent  
Yu et al.

(10) Patent No.: US 8,935,956 B2  
(45) Date of Patent: Jan. 20, 2015

(54) TOUCH-CONTROL TIRE PRESSURE SENSOR DEVICE AND ITS SETTING METHOD

(71) Applicant: Cub Elecparts Inc., Changhua (TW)

(72) Inventors: San-Chuan Yu, Changhua County (TW); Chao-Ching Hu, Tainan (TW); Tsan-Nung Wang, Changhua County (TW)

(73) Assignee: Cub Elecparts Inc., Changhua County (TW)

( * ) Notice: Subject to any disclaimer, the term of this patent is extended or adjusted under 35 U.S.C. 154(b) by 301 days.

(21) Appl. No.: 13/644,640

(22) Filed: Oct. 4, 2012

(65) Prior Publication Data

US 2013/0204486 A1    Aug. 8, 2013

Related U.S. Application Data

(63) Continuation-in-part of application No. 13/367,874, filed on Feb. 7, 2012, now abandoned.

(51) Int. Cl.
| | |
|---|---|
| *G01M 17/02* | (2006.01) |
| *B60C 23/00* | (2006.01) |
| *B60C 23/02* | (2006.01) |

(52) U.S. Cl.
USPC .............................. 73/146.2; 73/146; 340/442

(58) Field of Classification Search
None
See application file for complete search history.

(56) References Cited

U.S. PATENT DOCUMENTS

| | | | | |
|---|---|---|---|---|
| 5,573,611 | A * | 11/1996 | Koch et al. ................. | 152/152.1 |
| 6,580,363 | B1 * | 6/2003 | Wilson .......................... | 340/445 |
| 6,662,642 | B2 * | 12/2003 | Breed et al. .................... | 73/146 |
| 6,758,089 | B2 * | 7/2004 | Breed et al. .................... | 73/146 |
| 7,215,244 | B2 * | 5/2007 | Katou et al. .................. | 340/447 |
| 8,248,225 | B2 * | 8/2012 | Buck et al. .................... | 340/447 |
| 8,490,480 | B2 * | 7/2013 | Tadele et al. ................. | 73/146.5 |
| 8,576,058 | B2 * | 11/2013 | Wagner ......................... | 340/442 |
| 8,680,980 | B2 * | 3/2014 | Yu et al. ....................... | 340/442 |

* cited by examiner

*Primary Examiner* — Lisa Caputo  
*Assistant Examiner* — Jermaine Jenkins  
(74) *Attorney, Agent, or Firm* — Muncy, Geissler, Olds & Lowe, P.C.

(57) ABSTRACT

A touch-control tire pressure sensor device includes a housing holding an air nozzle at one side thereof, a circuit board accommodated in the housing and carrying a processor and memory unit having electrically coupled thereto a pressure sensor unit, a temperature sensor unit, an acceleration sensor unit, a LF transmission interface and a RF transmission interface for transmitting a sensed signal to an on-vehicle main unit, a battery pack providing the circuit board with the necessary working voltage, and a conducting plate having one end connected to the touch sensor IC and an opposite end kept in contact with the air nozzle.

7 Claims, 3 Drawing Sheets

TOUCH-CONTROL TIRE PRESSURE SENSOR DEVICE AND ITS SETTING METHOD

CROSS-REFERENCE TO RELATED APPLICATIONS

This application is a continuation-in-part application of U.S. application Ser. No. 13/367,874 filed on Feb. 7, 2012. The disclosure of which is herein incorporated by reference in its entirety.

BACKGROUND OF THE INVENTION

1. Field of the Invention

The present invention relates to tire pressure monitoring technology and more particularly, to a touch-control tire pressure sensor device.

2. Description of the Related Art

A tire pressure sensor device generally provide a re-learning mode for enabling an on-vehicle main unit to memorize the identification code of each of the four wheels of the vehicle carrying the on-vehicle main unit. Subject to the respective identification codes, the on-vehicle main unit can recognize the data of each of the four wheels and display the temperature, tire pressure and other related data of the respective wheel. If a wheel tire abnormality occurs, the on-vehicle main unit can give a warning message indicative of the abnormality of the respective wheel tire. After installation of a commercial tire sensor in a vehicle tire, a re-learning mode is initiated. The re-learning mode includes two types, namely, the on-travel automatic re-learning mode and the still type manual re-learning mode. If the still type manual re-learning mode is employed, the procedure is to let the on-vehicle main unit enter the re-learning mode, and then to enable the tire sensors of the four wheels output a respective wireless signal to the on-vehicle main unit subject to a predetermined sequence, for example, the sequence of left front→right front→right rear→left rear. Thus, the on-vehicle main unit can memorize the identification codes of the four wheels. Currently, enabling the tire pressure sensor of a vehicle tire to output a wireless signal can be done by means of using a magnet, using a low frequency setting tool, or discharging the tire pressure. However, because a magnet or low frequency setting tool is not readily available, it is not so simple to enable the tire pressure sensor of a vehicle tire to output a wireless signal by using a magnet or low frequency setting tool. Enabling the tire pressure sensor of a vehicle tire to output a wireless signal by discharging the tire pressure is quite simple, however, the user must inflate the tire to the original standard value after the re-learning mode. The operation procedure of this re-learning mode is troublesome.

SUMMARY OF THE INVENTION

The present invention has been accomplished under the circumstances in view. It is the main object of the present invention to provide a touch-control tire pressure sensor device, which can be directly triggered to output a signal without any special tool.

To achieve this and other objects of the present invention, a touch-control tire pressure sensor device comprises a housing comprising an air nozzle located at one side thereof, a circuit board comprising a processor and memory unit, a pressure sensor unit electrically coupled to the processor and memory unit and adapted to sense the pressure level of a vehicle tire, a temperature sensor unit electrically coupled to the processor and memory unit and adapted to sense the temperature of the vehicle tire, an acceleration sensor unit electrically coupled to the processor and memory unit and adapted to sense the acceleration value of the vehicle tire, a LF (low frequency) transmission interface and a RF (radio frequency) transmission interface respectively and electrically coupled to the processor and memory unit and adapted to transmit a sensed data to an on-vehicle receiver by a low frequency or radio frequency and a touch control IC electrically coupled to the processor and memory unit, a battery pack electrically coupled to the processor and memory unit and adapted to provide the circuit board with the necessary working power supply, and a conducting plate having a first end thereof electrically connected to the touch control IC of the circuit board and an opposing second end thereof kept in contact with the air nozzle electrically.

Further, the touch sensor IC can be induced to output a logic signal to the processor and memory unit when touched by an external conductive object to cause a change in electrical charge.

Other advantages and features of the present invention will be fully understood by reference to the following specification in conjunction with the accompanying drawings, in which like reference signs denote like components of structure.

DETAILED DESCRIPTION OF THE INVENTION

Figure 1:
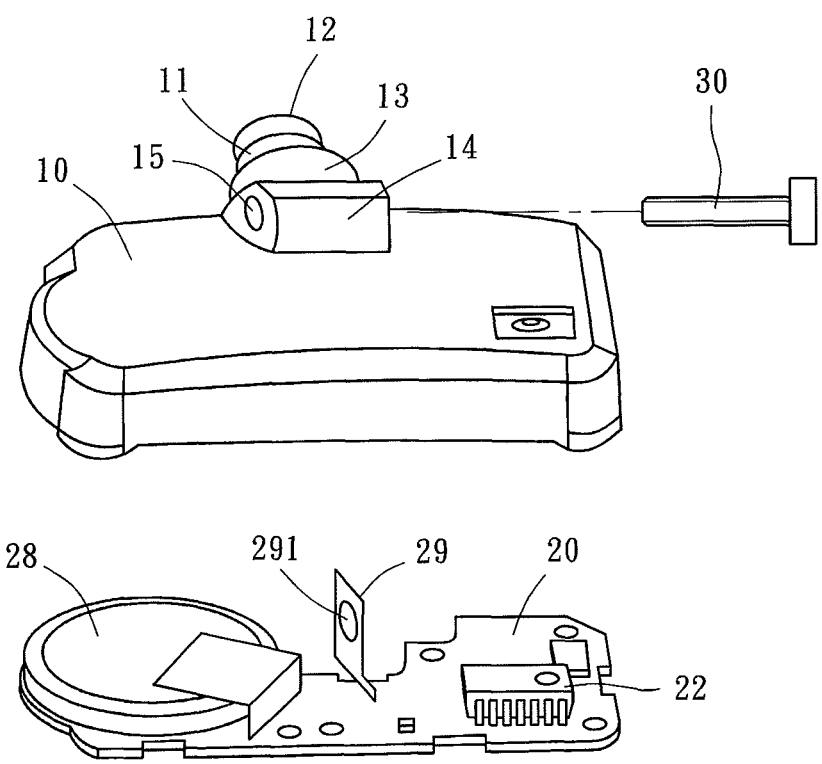
FIG. 1 is an exploded view of a touch-control tire pressure sensor device in accordance with a first embodiment of the present invention.
Figure 2:
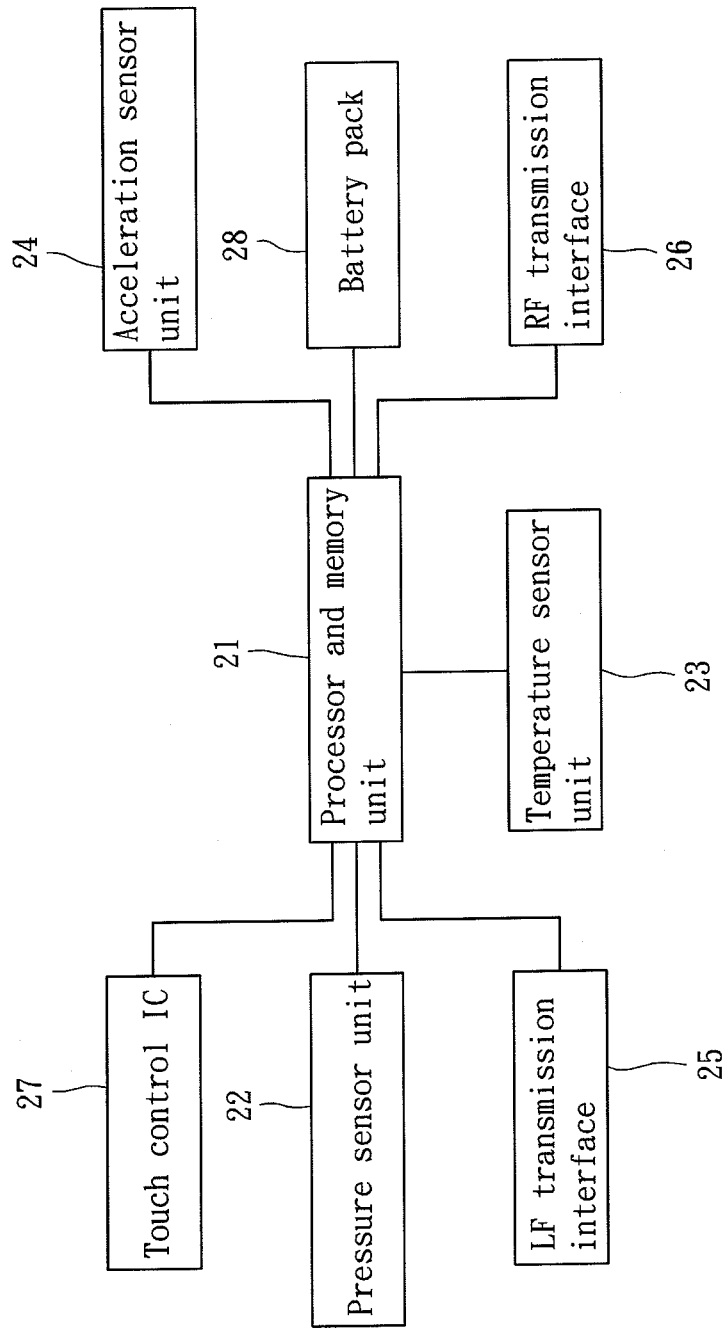
FIG. 2 is a block diagram of the circuit board of the touch-control tire pressure sensor device in accordance with the first embodiment of the present invention.

Referring to FIGS. 1 and 2, a touch-control tire pressure sensor device in accordance with the present invention is shown comprising a housing 10, an air nozzle 11 located at one side of the housing 10 and having opposing air intake end 12 and connection end 13 and a through hole (not shown) defined in the connection end 13, a circuit board 20, which is mounted inside the housing 10 and comprises a processor and memory unit 21, a pressure sensor unit 22 electrically coupled to the processor and memory unit 21 and adapted to sense tire pressure, a temperature sensor unit 23 electrically coupled to the processor and memory unit 21 and adapted to sense tire internal temperature, an acceleration sensor unit 24 electrically coupled to the processor and memory unit 21 and adapted to sense tire acceleration value, and a LF (low frequency) transmission interface 25 and a RF (radio frequency) transmission interface 26 respectively electrically coupled to the processor and memory unit 21 and adapted to transmit the sensed data to an on-vehicle receiver by a low frequency or radio frequency, a touch control IC 27 electrically coupled to the processor and memory unit 21, a battery pack 28 electrically coupled to the processor and memory unit 21 and adapted to provide the touch-control tire pressure sensor device with the necessary working power supply, and a conducting plate 29 having its one end connected to the touch control IC 27 of the circuit board 20 and its other end kept in contact with the air nozzle 11.

Further, the touch sensing function of the touch control IC 27 can be integrated into the processor and memory unit 21.

Further, the housing 10 comprises a holder block 14 located at one side thereof. The holder block 14 has a through hole 15 transversely cut therethrough. The air nozzle 11 is accommodated in the holder block 14 of the housing 10. The conducting plate 29 is longitudinally mounted at the circuit board 20, having a through hole 291 located at a distal end thereof. Further, a screw bolt 30 is inserted the transverse through hole 15 of the holder block 14 and the through hole 291 of the conducting plate 29 to affix the conducting plate 29, the air nozzle 11 and the housing 10 together.

During application of the present invention, the touch-control tire pressure sensor device is mounted in a vehicle tire (not shown). During a normal condition where the touch control IC 27 is not touched by an external object, a predetermined amount of electrical charge is stored in the capacitance between two electrodes thereof. When the user attaches an electrically conductive material to the air nozzle 11, for example, when a part of the user's body touches the air nozzle 11, the touch control IC 27 will be induced to change its storage electrical charge, providing a logic signal to the processor and memory unit 21. Upon receipt of the logic signal, the processor and memory unit 21 outputs an identification signal through the RF (radio frequency) transmission interface 26 to an on-vehicle main unit (not shown). Thus, the on-vehicle main unit can receive the identification signal from the touch-control tire pressure sensor device without operating any special tool or setting machine.

Figure 3:
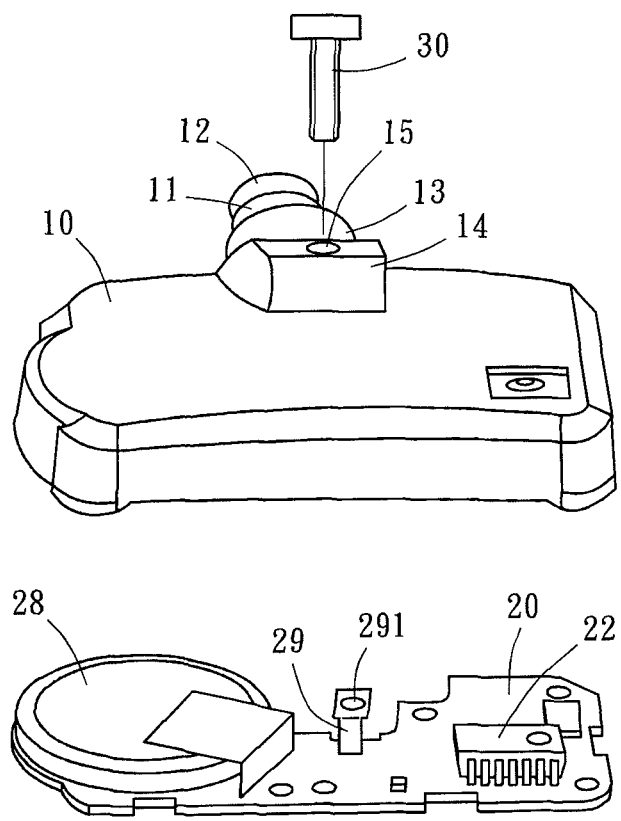
FIG. 3 is an exploded view of a touch-control tire pressure sensor device in accordance with a second embodiment of the present invention.

FIG. 3 illustrates a touch-control tire pressure sensor device in accordance with a second embodiment of the present invention. According to this second embodiment, the touch-control tire pressure sensor device comprises a housing 10, an air nozzle 11 located at one side of the housing 10 and having opposing air intake end 12 and connection end 13 and a through hole (not shown) defined in the connection end 13, a circuit board 20, which is mounted inside the housing 10 and comprises a processor and memory unit 21, a pressure sensor unit 22 electrically coupled to the processor and memory unit 21 and adapted to sense tire pressure, a temperature sensor unit 23 electrically coupled to the processor and memory unit 21 and adapted to sense tire internal temperature, an acceleration sensor unit 24 electrically coupled to the processor and memory unit 21 and adapted to sense tire acceleration value, and a LF (low frequency) transmission interface 25 and a RF (radio frequency) transmission interface 26 respectively electrically coupled to the processor and memory unit 21 and adapted to transmit the sensed data to an on-vehicle receiver by a low frequency or radio frequency, a touch control IC 27 electrically coupled to the processor and memory unit 21, a battery pack 28 electrically coupled to the processor and memory unit 21 and adapted to provide the touch-control tire pressure sensor device with the necessary working power supply, and a conducting plate 29 having its one end connected to the touch control IC 27 of the circuit board 20 and its other end kept in contact with the air nozzle 11.

Unlike the aforesaid first embodiment, the conducting plate 29 in accordance with this second embodiment is an L-shaped member having its longitudinal end electrically connected to the touch control IC 27 of the circuit board 20 and its transverse end provided with a through hole 291. The housing 10 comprises a holder block 14 defining a longitudinal through hole 15. The transverse end of the conducting plate 29 is inserted into the air nozzle 11. Further, a screw bolt 30 is inserted through the longitudinal through hole 15 of the holder block 14 and the through hole 291 of the conducting plate 29 to fasten the conducting plate 29, the air nozzle 11 and the housing 10 together.

Further, an algorithm may be built in the processor and memory unit 21 to remove noises, avoiding signal interference or false triggering. Further, the structural design of the present invention can adopt any of a variety tire sensors. The aforesaid mounting arrangement between the air nozzle and the housing is not a limitation. Any of known techniques to keep the conducting plate in positive contact with the air nozzle can be used, achieving optimal touch sensing performance. If the touch-control tire pressure sensor device of the present invention is installed in a new vehicle tire or the on-vehicle main unit is started to learn again, it will not be necessary to trigger the tire pressure sensor device to output a signal by using a low-frequency setting tool or magnet or discharging the tire pressure. By means of a physical operation to touch the air nozzle of the touch-control tire pressure sensor device, the processor and memory unit of the touch-control tire pressure sensor device can be triggered to initiate the noise filtering algorithm and then to output a wireless identification signal to the on-vehicle main unit. This operation manner is convenient, time saving and labor saving.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A touch-control tire pressure sensor device, comprising the steps of:
 a housing comprising an air nozzle located at one side thereof;
 a circuit board comprising a processor and memory unit, a pressure sensor unit electrically coupled to said processor and memory unit and adapted to sense the pressure level of a vehicle tire, a temperature sensor unit electrically coupled to said processor and memory unit and adapted to sense the temperature of said vehicle tire, an acceleration sensor unit electrically coupled to said processor and memory unit and adapted to sense the acceleration value of said vehicle tire, a LF (low frequency) transmission interface and a RF (radio frequency) transmission interface respectively and electrically coupled to said processor and memory unit and adapted to transmit a sensed data to an on-vehicle receiver by a low frequency or radio frequency, and a touch control IC electrically coupled to said processor and memory unit;
 a battery pack electrically coupled to said processor and memory unit and adapted to provide the touch-control tire pressure sensor device with the necessary working power supply; and
 a conducting plate having a first end thereof electrically connected to said touch control IC of said circuit board and an opposing second end thereof kept in contact with said air nozzle electrically.

2. The touch-control tire pressure sensor device as claimed in claim 1, wherein said conducting plate comprises a through hole at the second end thereof.

3. The touch-control tire pressure sensor device as claimed in claim 2, wherein said housing comprises a holder block located at one side thereof, said holder block comprising a transverse through hole; said air nozzle is accommodated in said holder block of said housing.

4. The touch-control tire pressure sensor device as claimed in claim 3, further comprising a screw bolt inserted through said transverse through hole of said holder block and the through hole of said conducting plate to fasten said conducting plate, said air nozzle and said housing together.

5. The touch-control tire pressure sensor device as claimed in claim 3, wherein said holder block comprising a longitudinal through hole; said air nozzle is accommodated in said holder block of said housing; the touch-control tire pressure sensor device further comprises a screw bolt inserted through said longitudinal through hole of said holder block and the through hole of said conducting plate to fasten said conducting plate, said air nozzle and said housing together.

6. The touch-control tire pressure sensor device as claimed in claim 5, wherein said conducting plate is a substantially L-shaped member comprising a longitudinal end electrically connected to said touch sensor IC of said circuit board, a transverse end extended from said longitudinal end and inserted into said air nozzle, and a through hole located at said transverse end for the passing of said screw bolt to fasten said conducting plate, said air nozzle and said housing together.

7. The touch-control tire pressure sensor device as claimed in claim 1, wherein said touch sensor IC is incorporated into said processor and memory unit.

\* \* \* \* \*